(12) United States Patent
Farook et al.

(10) Patent No.: US 11,343,157 B2
(45) Date of Patent: May 24, 2022

(54) SYSTEMS AND METHODS TO UTILIZE A NETWORK FABRIC DESIGN VIA DRAWING IMPORT

(71) Applicant: DELL PRODUCTS L.P., Round Rock, TX (US)

(72) Inventors: Mohamed Javeed Farook, Chennai (IN); Kamalakannan Rajamathivanan, Chennai (IN); Kumaraguru Narayanan, Chennai (IN); Madasamy Paulraj, Chennai (IN); Rajeshwar Ponrajan, Chennai (IN); Sudhakaran Balakrishnan, Chennai (IN); Hameem Ismail Sheik Najumudeen, Chennai (IN); Karthik Rathnakumar, Chennai (IN)

(73) Assignee: DELL PRODUCTS L.P., Round Rock, TX (US)

(*) Notice: Subject to any disclaimer, the term of this patent is extended or adjusted under 35 U.S.C. 154(b) by 59 days.

(21) Appl. No.: 16/388,033

(22) Filed: Apr. 18, 2019

(65) Prior Publication Data
US 2020/0336389 A1  Oct. 22, 2020

(51) Int. Cl.
*H04L 41/22* (2022.01)
*H04L 41/00* (2022.01)
*H04L 41/085* (2022.01)
*H04L 41/12* (2022.01)
*H04L 41/14* (2022.01)

(52) U.S. Cl.
CPC ............ *H04L 41/22* (2013.01); *H04L 41/085* (2013.01); *H04L 41/12* (2013.01); *H04L 41/145* (2013.01); *H04L 41/20* (2013.01)

(58) Field of Classification Search
CPC ....... H04L 41/22; H04L 41/085; H04L 41/12; H04L 41/145; H04L 41/20
USPC ......................................................... 709/223
See application file for complete search history.

(56) References Cited

U.S. PATENT DOCUMENTS

| | | | |
|---|---|---|---|
| 7,885,204 B1* | 2/2011 | Schongar | H04L 41/12 370/254 |
| 9,621,428 B1* | 4/2017 | Lev | H04L 41/12 |
| 2006/0092861 A1* | 5/2006 | Corday | H04L 41/0246 370/256 |

(Continued)

*Primary Examiner* — Joseph L Greene
(74) *Attorney, Agent, or Firm* — North Weber & Baugh LLP (57) ABSTRACT

Networking management tools enable network designers and administrator to design, configure, deploy, expand, and manage network fabrics. However, such tools may be limited—particularly when dealing with a deployed network fabric. In one or more embodiments, given a network drawing generated using a diagramming application and a set of defined stencils of network elements in which one or more network elements in the network drawing include associated network data properties, the network drawing is imported into a fabric management application. The fabric management application recognizes the network elements and the associated network data properties of the network drawing. The imported network drawing is used to map a network fabric represented by the imported network drawing into a representation usable by the fabric management tool. In one or more embodiments, configuration data may also be imported and used to map the network fabric.

20 Claims, 7 Drawing Sheets

(56) References Cited

U.S. PATENT DOCUMENTS

| | | | |
|---|---|---|---|
| 2007/0208840 A1* | 9/2007 | Mcconville | H04L 41/22 709/223 |
| 2009/0031222 A1* | 1/2009 | Nakamura | G06F 30/18 715/735 |
| 2011/0106860 A1* | 5/2011 | Wood | H04L 67/303 707/812 |
| 2011/0299535 A1* | 12/2011 | Vobbilisetty | H04L 67/1044 370/392 |
| 2016/0294632 A1* | 10/2016 | Bhatia | H04L 41/12 |
| 2018/0349524 A1* | 12/2018 | Treptow | H04L 41/145 |

* cited by examiner

SYSTEMS AND METHODS TO UTILIZE A NETWORK FABRIC DESIGN VIA DRAWING IMPORT

COPYRIGHT NOTICE

A portion of the disclosure of this patent document contains material that is subject to copyright protection. The copyright owner has no objection to the facsimile reproduction by anyone of the patent document, as it appears in the Patent and Trademark Office patent file or records, but otherwise reserves all copyright rights whatsoever.

BACKGROUND

The present disclosure relates generally to information handling systems. More particularly, the present disclosure relates to systems and methods to utilize a network fabric design via drawing import.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Networks are growing increasingly larger and increasing more complex. To add to the complexity, networking devices are drastically denser in terms of bandwidth and features that are supported. To help with this increasing complexity, fabric management tools are provided that enable customers to design, configure, deploy, expand, and manage a predefined set of fabrics. Detecting the deployed fabrics in a brownfield environment and providing a means for management and expansion is important for success of a fabric management tools. A "brownfield" deployment typically refers to the development and deployment of a new system in the presence of an existing system. For example, a legacy system having existing infrastructure and deployed configuration may be upgraded and/or expanded. The existence of a pre-existing deployment can add to the design and deployment complexity when trying to add or upgrade such a system because the design must take into account—and depending upon the final deployment, must co-exist with—the existing system and its configuration.

Accordingly, it is desirable to provide systems and methods that can facilitate management use of a network fabric drawing.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may be not to scale.

DETAILED DESCRIPTION

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any lists that follow are examples and not meant to be limited to the listed items.

A service, function, or resource is not limited to a single service, function, or resource; usage of these terms may refer to a grouping of related services, functions, or resources, which may be distributed or aggregated. The use of memory, database, information base, data store, tables, hardware, and the like may be used herein to refer to system component or components into which information may be entered or otherwise recorded. The terms "data," "information," along with similar terms may be replaced by other terminologies referring to a group of bits, and may be used interchangeably. The terms "packet" or "frame" shall be understood to mean a group of bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." A network element is any element that exists within a network device or a network, including but not limited to switches, routers, bridges, cables, test equipment, power supplies, racks, storage devices, infrastructure components, features, etc.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. All documents cited herein are incorporated by reference herein in their entirety.

It shall also be noted that although embodiments described herein may be within the context of Microsoft® Visio® produced by Microsoft of Redmond, Wash. However, it shall be noted that aspects of the present disclosure are not so limited. Rather, other design or drawing applications may also be used.

A. INTRODUCTION

Fabric management tools enable customers to design, configure, deploy, expand and manage a fabric. While fabric management tools, which may also be referred to as network fabric control tools, provide a number of features that can assist in network design, configuration, provisioning, telemetry, and management of a fabric, these benefits may be limited or unavailable when trying to expand an existing network. Because the network exists and is already configured, for the management tool to be effective, the details of the existing network should be input to the management tool. To date, there is no effective way to import such data into a fabric management tool; this problem is due, in part, to the fact that most, if not all, existing management tools focus on new deployments. New deployments are, of course, easier to address because there is no legacy equipment or configurations that must be considered.

However, many networks currently exist and due to a number of factors (e.g., increased bandwidth demands, adding new equipment, adding new features, etc.) often need to expand. Accordingly, detecting a deployed fabric in a brownfield environment and providing a means for expansion and management not only makes it easier for network administrators/designers but also reduces the number of errors in having to recreate by hand the existing network in the management tool. Furthermore, being able to detect and model an existing deployment not only makes it easier for network designers and administrators, but it also reduces problems when deploying and managing the network. Thus, detecting deployed fabrics and providing a means for management and expansion is important for success of a fabric management tool.

Network planning and design for the datacenters are done widely using diagramming (or drawing) applications, such as Microsoft® Visio®, although other diagramming application may be employed. Aspects of the current patent document include methodologies for importing the network design diagrams along with the network elements' configuration files into a network management tool to detect and manage the brownfield fabrics or expanded networks that start from the brownfield fabrics.

B. NETWORK ELEMENT STENCILS

In one or more embodiments, an aspect of the present disclosure is the concept of drawing diagram stencils. To help facilitate the representation or depiction of a network element, companies, such as Dell EMC, may provide standard shapes of network elements (such as, switches, routers, storage device, links, etc.) in the form of stencils to draw network fabrics. In one or more embodiments, these stencils accurately depict aspects of a network element. For example, a specific router will be depicted with the correct number and types of ports and may also be depicted to resemble the actual device. Consider, by way of illustration, the network element 105 depicted in FIG. 1.

Figure 1:
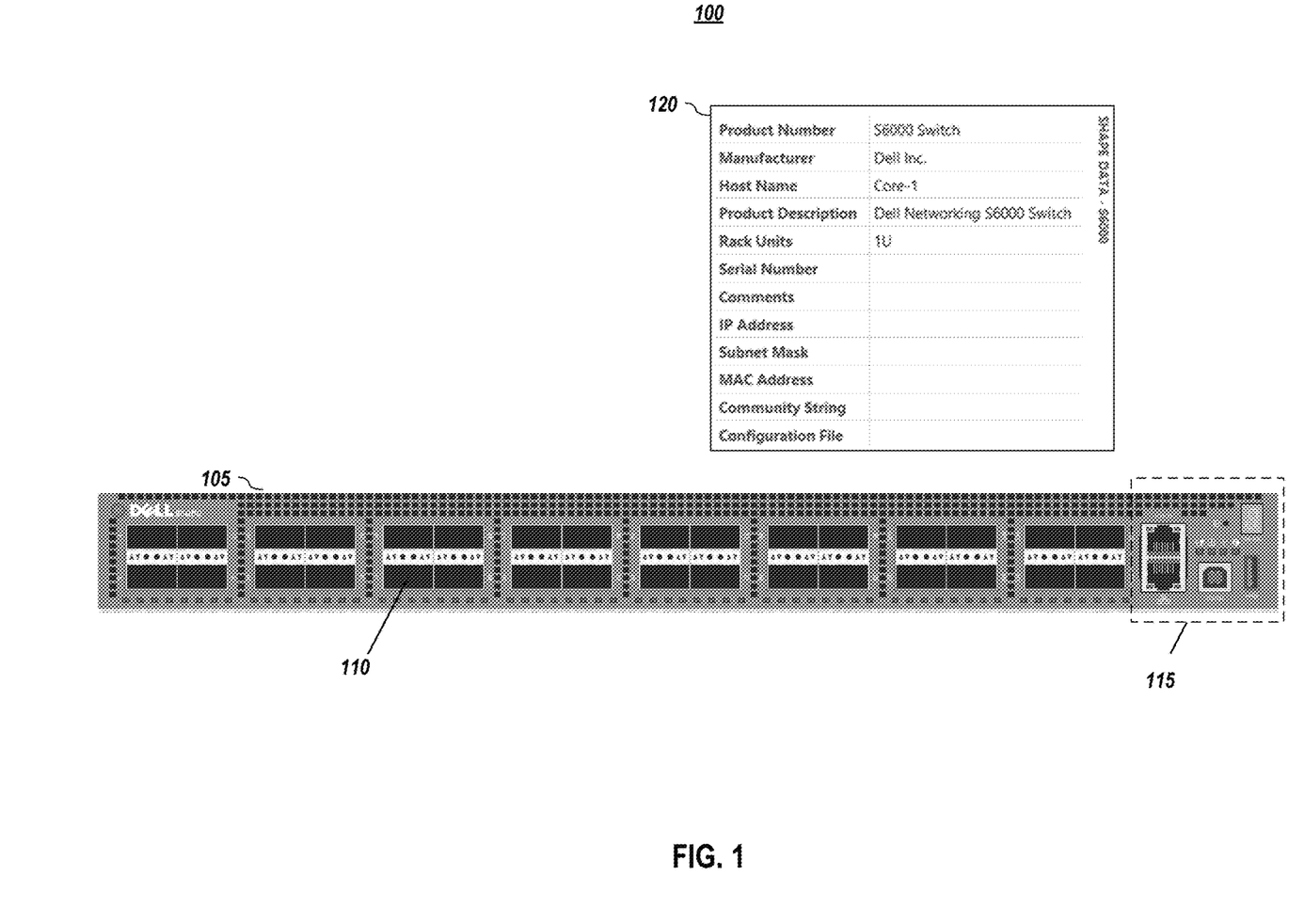
FIG. 1 ("FIG. 1") depicts an example stencil as used in a drawing application and an associated networking data window, according to embodiments of the present disclosure.

FIG. 1 depicts an example stencil as used in a drawing application and an associated networking data window, according to embodiments of the present disclosure. The stencil 105 depicted in FIG. 1 is of a Dell® S6000 switch. The Dell Networking S Series S6000 10/40 GbE switch is built for applications in high-performance data center and computing environments. As shown in the stencil instance, the network element 105 is represented as it would appear (or quite nearly as it would appear) in real life. For example, depicted are all of its ports (e.g., port 110) as well as other connections, indicator lights, and other display items (collectively 115).

In one or more embodiments, a stencil element, such as the S6000 switch 105 shown in FIG. 1, may include associated network data. For example, as illustrated in FIG. 1, the switch 105 has an overall set of data, an example of which is depicted in box 120. As depicted in the embodiment shown in FIG. 1, the associated network data for the switch 105 may include such items as product name (e.g., S6000 Switch), manufacturer (e.g., Dell Inc.), host name (in this example, the switch has been named Core-1), product description, size in terms of rack units, serial number, Internet Protocol (IP) address, Subnet Mask, Media Access Control (MAC) address, community string (which may include a Simple Network Management Protocol (SNMP) community string that can be used to authenticate SNMP requests), and configuration file (which may include a name and/or location of the configuration file (e.g., a file server URL or the name of the file)). In one or more embodiments, in addition to having associated network data for the overall device, each component (e.g., port, connector, etc.) of the stencil may also have associated data. For example, port 110 may have a link that connects it to another device. Stencil templates may include places for associating information about the port (e.g., its bandwidth) and its configuration (e.g., protocols, membership in a Virtual Local Area Network (VLAN), Link Aggregation Group (LAG), etc.).

In one or more embodiments, the stencils and the associated networking metadata may be done according to pre-defined standards or schema. Having the various stencils following pre-defined formats or schema make it easier for importing a network drawing into a management tool. In one or more embodiments, the stencils and their instances when used in drawings may be in a machine-readable language, such as eXtensible Markup Language (XML) or other format that facilitate parsing. Having a known schema one can write a parser to parse to data. For example, by having known formats and using known encoding, the management tool can readily parse the information when importing a network diagram.

An additional benefit of using stencils is that as new products are created and released by a company, new stencils can also be released. Thus, the stencils can be updated to enable customers to prepare standard and unified designs.

C. METHODOLOGY EMBODIMENTS

Figure 2:
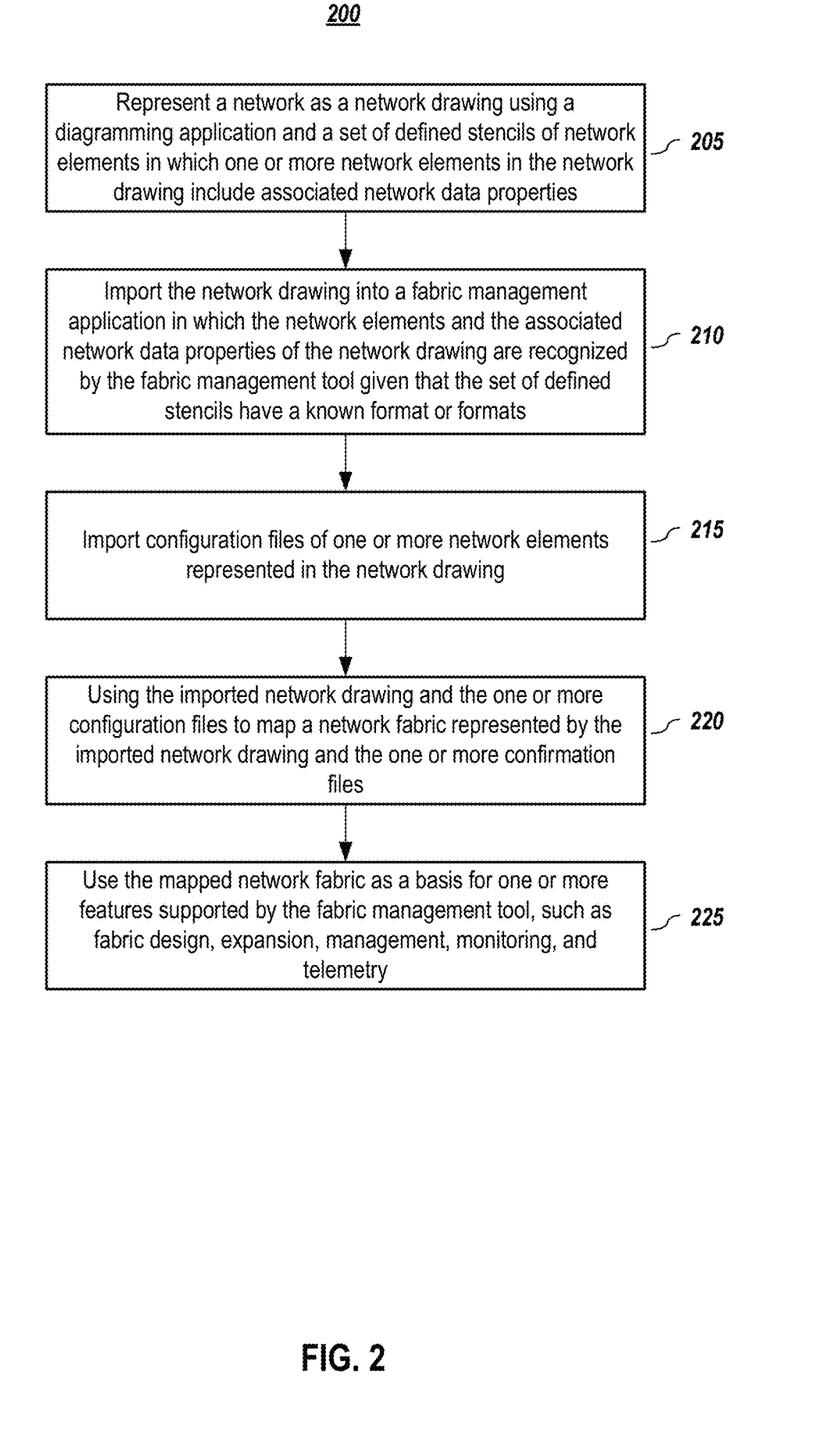
FIG. 2 depicts an example methodology, according to embodiments of the present disclosure.
Figure 3:
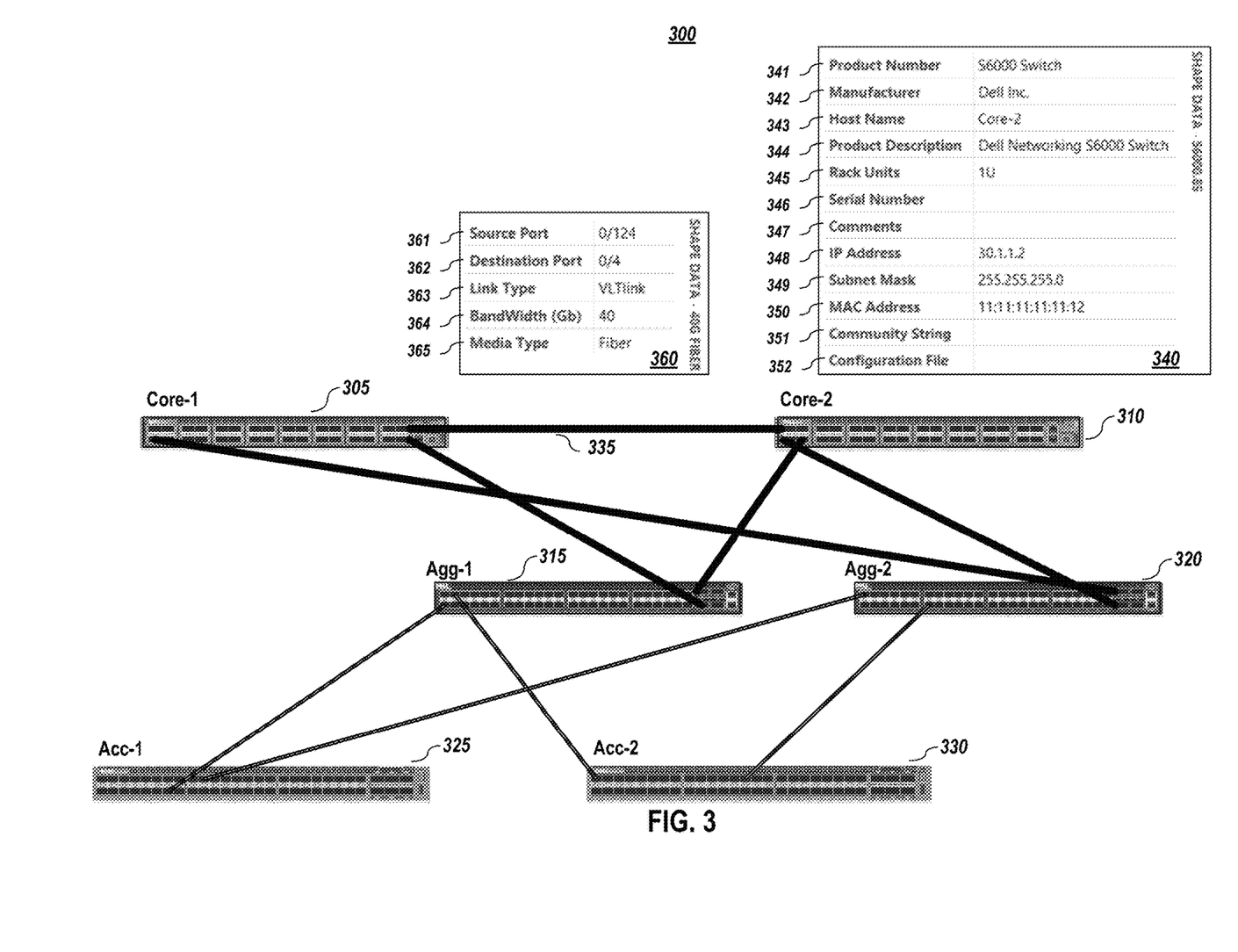
FIG. 3 depicts an example network represented in a drawing application, according to embodiments of the present disclosure.

FIG. 2 depicts an example methodology according to embodiments of the present disclosure. In one or more embodiments, a network is represented (205) as a network drawing using a diagramming application and a set of defined stencils of network elements in which one or more network elements in the network drawing include associated network data properties. FIG. 3 depicts an example network 300 represented in a drawing application, according to embodiments of the present disclosure. The example network 300 comprises two core switches (Core-1 305 and Core-2 310), two aggregation switches (Agg-1 315 and Agg-2 320), and two access switches (Acc-1 325 and Acc-2 330). It shall be noted that this example network fabric 300 is provided only by way of illustration.

Also depicted in FIG. 3 are some of the associated network data. For example, network data associated with Core-2 switch 310 is shown in box 340. As shown in the depicted embodiment, the associated data may include such items as:
  product name (e.g., S6000 Switch) 341;
  manufacturer (e.g., Dell Inc.) 342;
  host name (e.g., Core-2) 343;
  product description (e.g., Dell Networking S6000 Switch) 344;
  rack unit size (e.g., 1 rack unit) 345;
  serial number (not input in this example) 346;
  Internet Protocol (IP) address (e.g., 30.1.1.2) 348;
  Subnet Mask (e.g., 255.255.255.0) 349; and
  Media Access Control (MAC) address (e.g., 11:11:11:11:11:12) 350.

It shall be noted that fewer or more items may be associated with a network element. For example, comments 347, community string 351, and configuration file 352 are also depicted in FIG. 3.

In one or more embodiments, the type of associated network information may be related to the type of network element. Consider, by way of illustration, the associated networking data in box 360. The networking data in box 360 is associated with link 355, which connects Core-1 305 to Core-2 310. As shown in the depicted embodiment, the associated data 360 may include such items as:
  source port (e.g., 0/124) 361;
  destination port (e.g., 0/4) 362;
  link type (e.g., Virtual Link Trunk (VLT) link) 363;
  bandwidth (e.g., 40 Gigabytes (Gb)) 364; and
  media type (e.g., fiber) 365.

Again, it shall be noted that fewer or more items may be associated with a network element. It shall also be noted that while including more information is likely to be more beneficial when importing into a fabric management tool, completing all fields, in one or more embodiments, is not required.

Returning to FIG. 2, given a network drawing or diagram, such as the one shown in FIG. 3, it may be imported (210) into a fabric management application. In one or more embodiments, the network elements and the associated network data properties of the network drawing are recognized by the fabric management tool given that the set of defined stencils have a known format or known formats. In one or more embodiments, a parser may be used to parse the network diagram to obtain the information conveyed by the network drawing.

In one or more embodiments, the network drawing may represent an existing, deployed network. Alternatively, in one or more embodiments, the network drawing may represent a new network that has yet to be built.

In one or more embodiment, configuration files of one or more network elements represented in the network drawing may also be imported (215) into the fabric management tool. For example, in one or more embodiments, a switch configuration may be imported and may include, for example, logical information like VLANs, port channels, and other protocol information.

In one or more embodiment, the imported network drawing and one or more configuration files may be used to map (220) the network fabric represented by the imported network drawing and the one or more confirmation files into a network representation used by the management tool. In one or more embodiments, information in the imported information may be used to correlate information about the network fabric or specific network element when mapping it using the fabric management tool. In one or more embodiments, if the configuration file field is left empty, IP address may be used to locate or associate a configuration file to a network device. For example, the IP address associated with a network element from the drawing may be used to correlate that network element to an imported configuration file, which will also identify the IP address for its network element. In one or more embodiments, the imported information may be also used to further determine or infer information about the network when mapping it using the fabric management tool. For example, link information, link bandwidths, connections, protocols that have been enabled, source and destination information, and virtual link trunking (VLT) information may be used to determine or infer network-related information such as, link aggregation groups (LAGs), topologies (e.g., spine-leaf topologies), etc.

Finally, given the mapped network fabric, the fabric management tool may use (225) it as a basis for one or more features supported by the management tool. In one or more embodiments, the features may include network design & expansion, network management, monitoring, and telemetry. For example, the mapped network fabric may be used by the management tool to expand the mapped network, provision it, and then when deployed, to use telemetry data and monitoring to maintain and operate the expanded network.

It should be noted that embodiments of the present disclosure may be used even if the imported network design includes features that are not supported by the management tool. For example, if the mapped fabric fits within the supported fabrics of the management tool, all features offered by the tool may be applied to the mapped fabric. However, in one or more embodiments, if the mapped network fabric includes elements that are beyond the current capabilities of the management tool, a subset of features that are supported may still be applied. Of course, in one or more embodiments, if the management tool's capabilities are increased through one or more upgrades, then additional features may be employed for the mapped network as the feature are added to the management tool.

Figure 4:
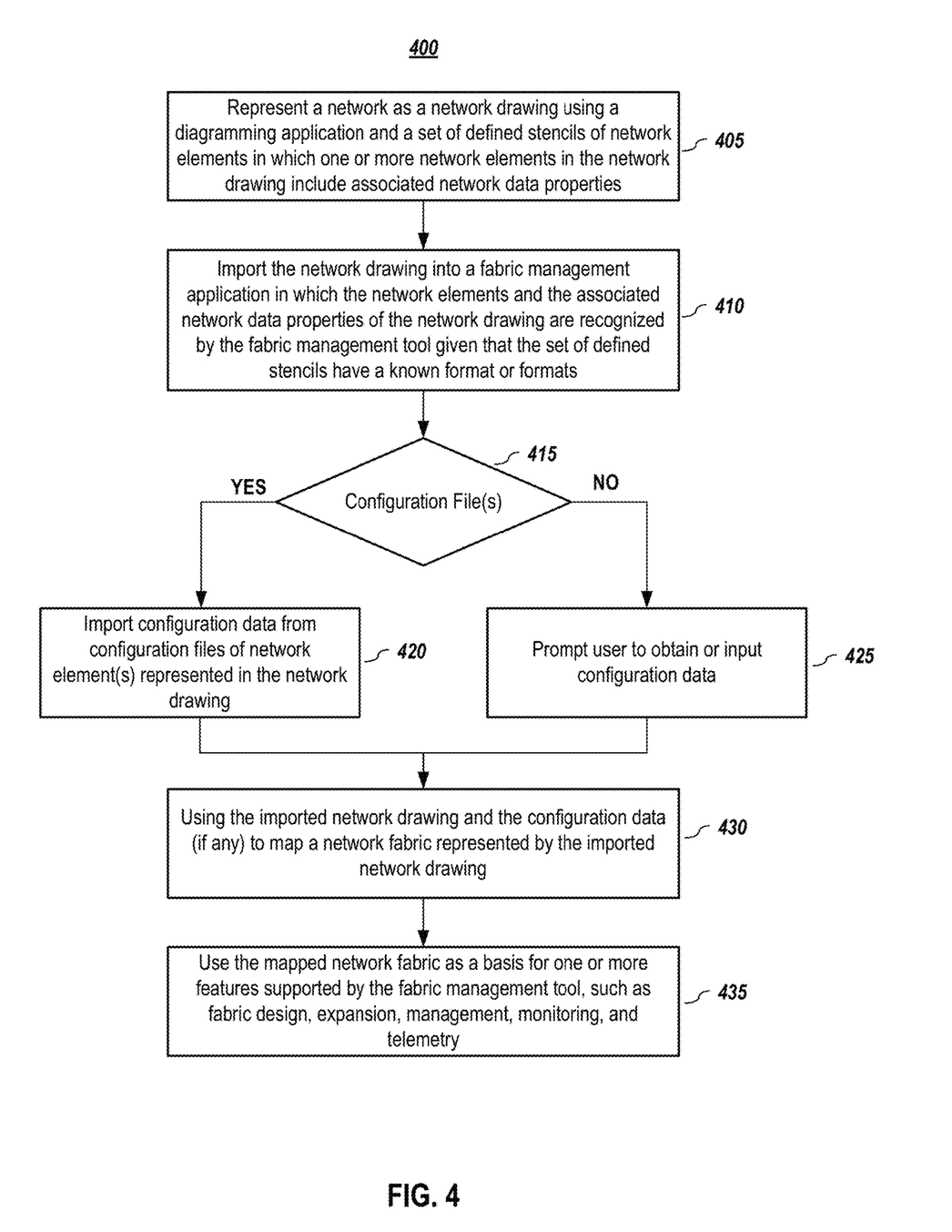
FIG. 4 depicts an alternative methodology, according to embodiments of the present disclosure.

FIG. 4 depicts an alternative methodology according to embodiments of the present disclosure. As with FIG. 2, in one or more embodiments, a network is represented (405) as a network drawing using a diagramming application and a set of defined stencils of network elements in which one or more network elements in the network drawing include associated network data properties.

Given a network drawing or diagram, like the one shown in FIG. 3, it may be imported (410) into a fabric management application given that the management tool is able to recognize and import the network elements and the associated network data properties of the network drawing. In one or more embodiments, a parser may be used to parse the network diagram to obtain the information conveyed by the network drawing.

In one or more embodiments, the management tool may receive or prompt to receive configuration files associated with the network drawing. Responsive (415) to there being configuration files, the configuration file or files may be imported (420) in like manner as described with respect to FIG. 2.

However, unlike the example methodology embodiment depicted in FIG. 2, there may not be configuration files associated with the network drawing or for a specific network element in the drawing that can be imported. For example, the network may not yet exist, or the user may not have access to a configuration file or files. Accordingly, in one or more embodiments, the management tool may prompt (425) or otherwise allow a user to input configuration-related data about one or more network elements.

In one or more embodiment, in like manner as discussed with respect to FIG. 2, the imported network drawing and the configuration-related data (if any), whether imported from configuration files or manually entered, may be used to map (430) a network fabric represented by the imported network drawing into a mapped representation used by the management tool. Finally, given the mapped network fabric, the fabric management tool may use (435) it as a basis for one or more features supported by the management tool.

D. SOME ADVANTAGES

One skilled in the art shall recognize that aspects of the present disclosure provide a number of benefits. First, the embodiments provide simple and effective ways to allow customers to use a fabric management tool to manage and expand an existing deployed fabric. Second, the embodiments provide simple and effective ways to allow customers to design a new network fabric using a drawing application and then import that fabric into a fabric management tool to manage the network fabric once deployed. Third, embodiments herein are easy to implement and educate customers. Many customers currently use customer-provided drawing stencils; therefore, this provides new methodologies that include some familiarity to customers. Finally, embodiment herein can be useful through a range of imported information—from basic configuration information (e.g., only information imported from the network drawing) more complex information may be determined such as topologies, LAGs, link connections, etc. But, if additional networking-related information is imported or added (e.g., routing protocols enabled, access control lists, etc.), more extensive networking features may be implemented by the management tool.

Example of information that may be imported comprise:
a. Example data available in drawing application file:
   i. Switch Details
      1. IP Address and subnet mask
      2. MAC Address
      3. Switch Name
      4. Default Gateway
      5. Tier (Core, Aggregation and Access in case on spine and leaf topology)
   ii. Link Details
      1. Source Port
      2. Destination Port
      3. Source switch
      4. Destination Switch
      5. Link Type (Uplink, Interlink, Inter Switch Link (VLT), Server/Down Link)
   iii. Topology Details
      1. VLT/LAG
      2. Port Channel
b. Example data available in a network device's running configuration:
   i. Interface IP address and mask, in the case of Layer 3 links
   ii. VLANs
   iii. Router ID and Autonomous System Number (ASN) for Open Shortest Path First (OSPF) or Border Gateway Protocol (BGP)
   iv. External Link details like uplink IP and Gateway port details
   v. Access Control List (ACL)

One skilled in the art shall recognize other advantages of embodiments of the present disclosure.

Figure 5:
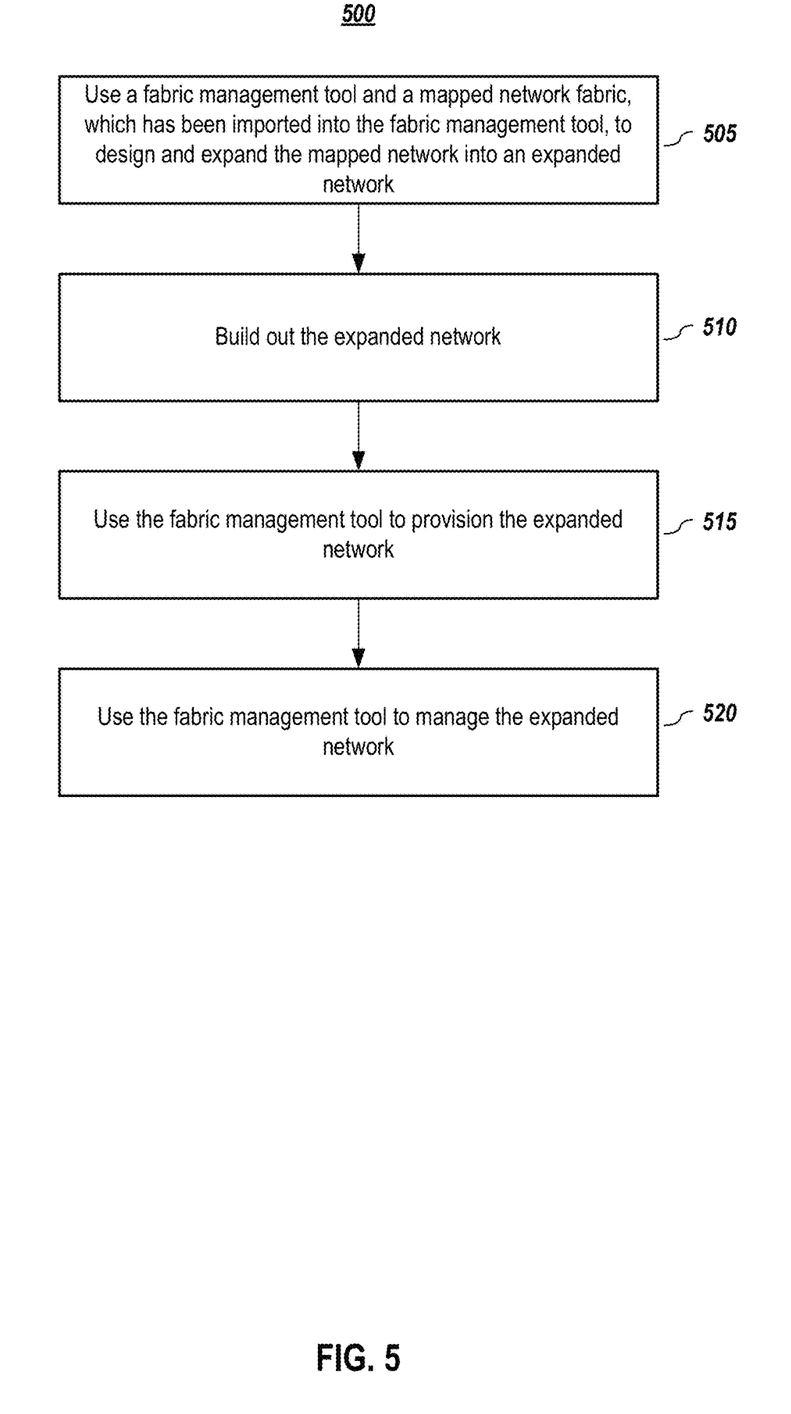
FIG. 5 provide an example use, according to embodiments of the present disclosure.

FIG. 5 provide an example use case, according to embodiments of the present disclosure. In one or more embodiments, a mapped network fabric that has been entered into a fabric management tool via importing (e.g., such as described with respect to FIG. 2 or FIG. 4) may be used (505) to design and expand the mapped network beyond its current configuration. One skilled in the art shall recognize that it much easier to input network information from a drawing application as a starting point. This advantage is particularly true in the case of brownfield networks—especially where the drawing and configuration files already exists. It is extremely tedious (and subject to errors) to draw from the very beginning and have to use management protocols to query network elements to gather network-related data.

In one or more embodiments, after importing the network information in a management tool, the management tool can use the mapped network to design (510) an expanded network, and the expanded network may be deployed (i.e., the expansion elements are added (510) and configured/provisioned (515)).

Finally, in one or more embodiments, the fabric management tool may continue to manage (520) the expanded network using one or more features supported by the tool (e.g., fabric management, monitoring, and telemetry). As noted previously, if the expanded design is beyond the scope of the management tool, any subset of available feature that are supported (e.g., monitor and telemetry) may be employed. It shall be noted that an expanded network can also be subsequent expanded using the management tool.

In one or more embodiments, the management tool may export an expanded network design to a format for a drawing application. It may be that drawing is more efficient in the drawing application. In such embodiments, network representation may be communicated between the management tool and the drawing application.

E. SYSTEM EMBODIMENTS

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, etc.) smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 6:
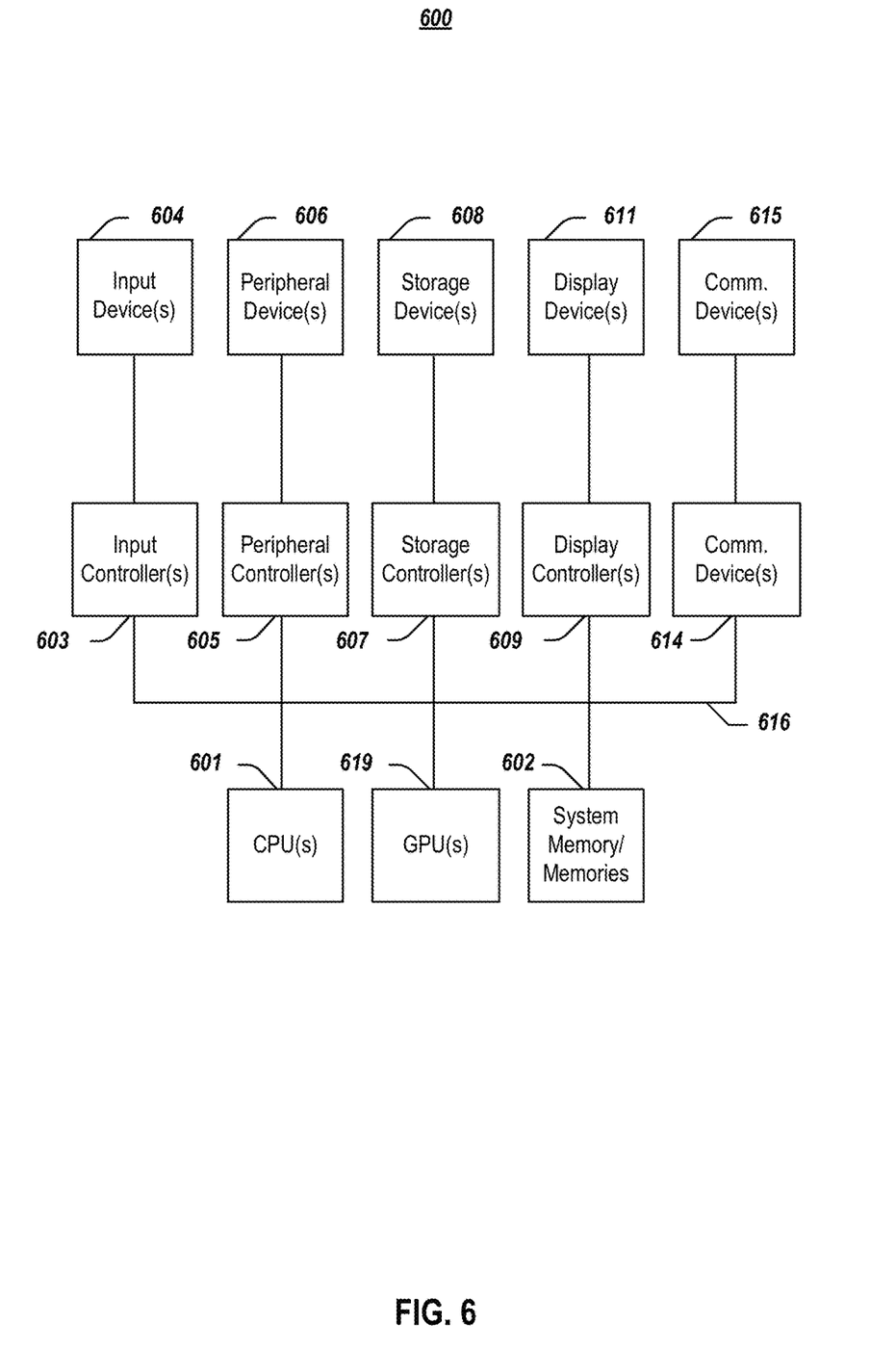
FIG. 6 depicts a simplified block diagram of an information handling system, according to embodiments of the present invention.

FIG. 6 depicts a simplified block diagram of an information handling system (or computing system) according to embodiments of the present disclosure. It will be understood that the functionalities shown for system 600 may operate to support various embodiments of a computing system—although it shall be understood that a computing system may be differently configured and include different components, including having fewer or more components as depicted in FIG. 6.

As illustrated in FIG. 6, the computing system 600 includes one or more central processing units (CPU) 601 that provides computing resources and controls the computer. CPU 601 may be implemented with a microprocessor or the like, and may also include one or more graphics processing units (GPU) 619 and/or a floating-point coprocessor for mathematical computations. System 600 may also include a system memory 602, which may be in the form of random-access memory (RAM), read-only memory (ROM), or both.

A number of controllers and peripheral devices may also be provided, as shown in FIG. 6. An input controller 603 represents an interface to various input device(s) 604, such as a keyboard, mouse, touchscreen, and/or stylus. The computing system 600 may also include a storage controller 607 for interfacing with one or more storage devices 608 each of which includes a storage medium such as magnetic tape or disk, or an optical medium that might be used to record programs of instructions for operating systems, utilities, and applications, which may include embodiments of programs that implement various aspects of the present disclosure. Storage device(s) 608 may also be used to store processed data or data to be processed in accordance with the disclosure. The system 600 may also include a display controller 609 for providing an interface to a display device 611, which may be a cathode ray tube (CRT), a thin film transistor (TFT) display, organic light-emitting diode, electroluminescent panel, plasma panel, or other type of display. The computing system 600 may also include one or more peripheral controllers or interfaces 605 for one or more peripherals 606. Examples of peripherals may include one or more printers, scanners, input devices, output devices, sensors, and the like. A communications controller 614 may interface with one or more communication devices 615, which enables the system 600 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 616, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Figure 7:
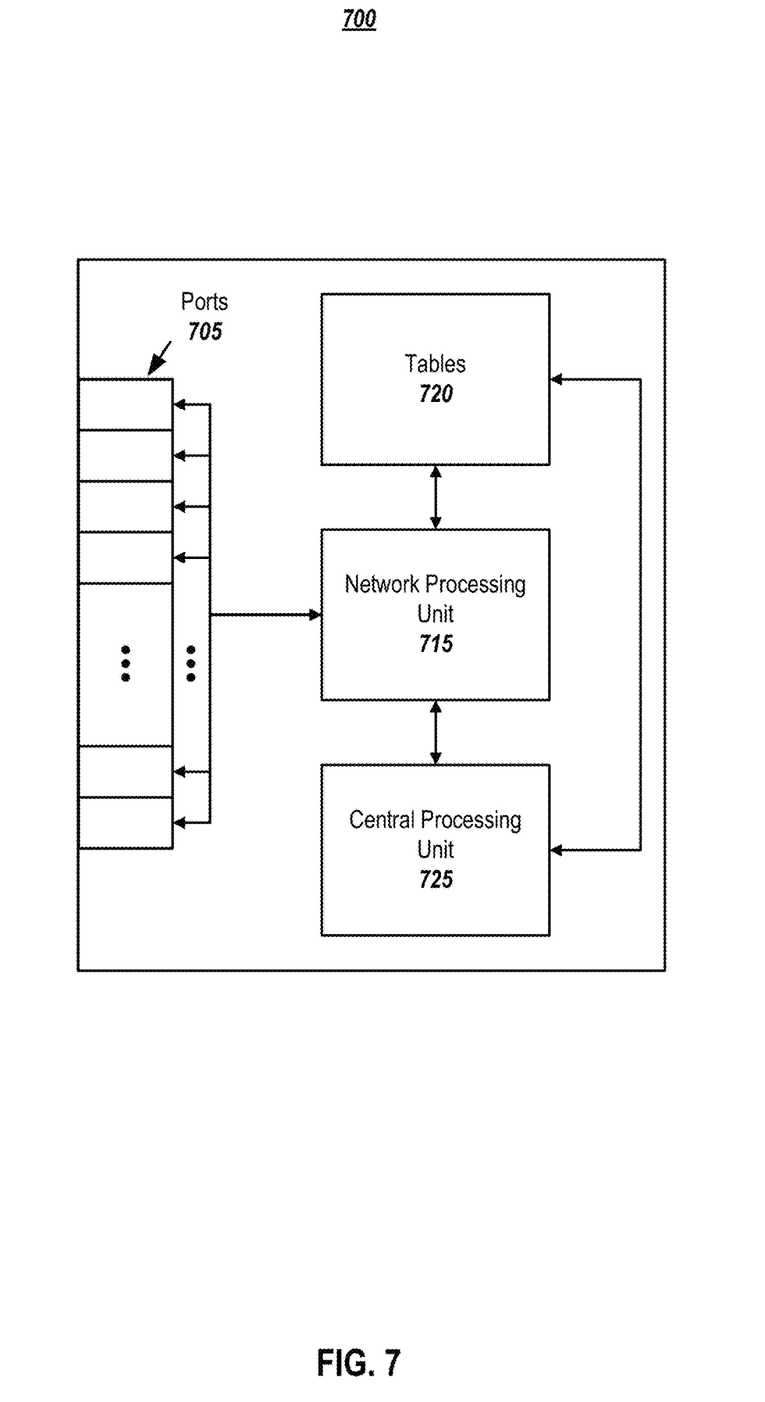
FIG. 7 depicts an alternative block diagram of an information handling system, according to embodiments of the present disclosure.

FIG. 7 depicts an alternative block diagram of an information handling system, according to embodiments of the present disclosure. It will be understood that the functionalities shown for system 700 may operate to support various embodiments of the present disclosure—although it shall be understood that such system may be differently configured and include different components (including fewer or more components).

The information handling system 700 may include a plurality of I/O ports 705, a network processing unit (NPU) 715, one or more tables 720, and a central processing unit (CPU) 725. The system includes a power supply (not shown) and may also include other components, which are not shown for sake of simplicity.

In one or more embodiments, the 110 ports 705 may be connected via one or more cables to one or more other network devices or clients. The network processing unit 715 may use information included in the network data received at the node 700, as well as information stored in the tables 720, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method comprising:
given a network drawing file comprising a network drawing generated using a diagramming application and a set of defined stencils of network elements in which one or more network elements depicted in the network drawing include one or more associated logical network connectivity-related properties, importing the network drawing file, including the one or more associated logical network connectivity-related properties, which includes one or more logical network connectivity-related properties between one or more network elements of a network fabric depicted in the network drawing, into a fabric management application in which the one or more network elements and the associated logical network connectivity-related properties of the network fabric depicted in the network drawing are recognized by the fabric management application given that the set of defined stencils have a known format or formats;
using the imported network drawing file to generate a network fabric representation in the fabric management application; and
using the network fabric representation and the fabric management application to apply one or more features supported by the fabric management application to one or more network elements of a network fabric corresponding to the network fabric representation.

2. The computer-implemented method of claim 1 further comprising:
representing the network fabric as the network drawing using the diagramming application and the set of defined stencils of network elements in which at least some of the defined stencils comprise one or more fields for storing one or more associated logical network connectivity-related properties.

3. The computer-implemented method of claim 1 further comprising:
importing one or more configuration files associated with one or more network elements represented in the network drawing, in which a configuration file of a network element comprises logical network connectivity-related configuration information about the network element in a deployed network; and
correlating a configuration file from the one or more configuration files with a network element in the network drawing.

4. The computer-implemented method of claim 3 wherein the step of using the imported network drawing file to generate a network fabric representation in the fabric management application comprises:
using the imported network drawing file and the one or more configuration files to map the network fabric represented by the imported network drawing and the one or more confirmation files in the fabric management application.

5. The computer-implemented method of claim 4 wherein the step of using the imported network drawing file and the one or more configuration files to map the network fabric represented by the imported network drawing and the one or more confirmation files in the fabric management application further comprises:
determining one or more network relationships or configurations based upon at least some of the associated logical network connectivity-related properties, at least some of the one or more configuration files, or both.

6. The computer-implemented method of claim 5 wherein the step of determining one or more network relationships or configurations based upon at least some of the associated logical network connectivity-related properties, at least some of the one or more configuration files, or both comprises:

using at least some of the associated logical network connectivity-related properties, at least some of the one or more configuration files, or both to interpret whether a link aggregation group (LAG), port channel, or virtual link trunk exists in the network fabric.

7. The computer-implemented method of claim 1 wherein the networking drawing represents an existing network and the method further comprises:

using the network fabric representation to design an expansion of the existing network.

8. The computer-implemented method of claim 1 further comprising:

prompting a user to provide one or more pieces of networking information related to the network drawing.

9. A non-transitory computer-readable medium or media comprising one or more sequences of instructions which, when executed by at least one processor, causes steps to be performed comprising:

given a network drawing file comprising a network drawing generated using a diagramming application and a set of defined stencils of network elements in which one or more network elements depicted in the network drawing include one or more associated logical network connectivity-related properties, importing the network drawing file, including the one or more associated logical network connectivity-related properties, which includes one or more logical network connectivity-related properties between one or more network elements of a network fabric depicted in the network drawing, into a fabric management application in which the one or more network elements and the associated logical network connectivity-related properties of the network fabric depicted in the network drawing are recognized by the fabric management application given that the set of defined stencils have a known format or formats;

using the imported network drawing file to generate a network fabric representation in the fabric management application; and using the network fabric representation and the fabric management application to generate one or more configuration files to be applied to one or more network elements to configure at least part of a network fabric corresponding to the network fabric representation.

10. The non-transitory computer-readable medium or media of claim 9 further comprising one or more sequences of instructions which, when executed by at least one processor, causes steps to be performed comprising:

representing the network fabric as the network drawing using the diagramming application and the set of defined stencils of network elements in which at least some of the defined stencils comprise one or more fields for storing one or more associated logical network connectivity-related properties.

11. The non-transitory computer-readable medium or media of claim 9 further comprising one or more sequences of instructions which, when executed by at least one processor, causes steps to be performed comprising:

importing one or more configuration files associated with one or more network elements represented in the network drawing, in which a configuration file of a network element comprises logical network connectivity-related configuration information about the network element in a deployed network; and correlating a configuration file from the one or more configuration files with a network element in the network drawing.

12. The non-transitory computer-readable medium or media of claim 11 wherein the step of using the imported network drawing file to generate a network fabric representation in the fabric management application comprises:

using the imported network drawing file and the one or more configuration files to map the network fabric represented by the imported network drawing and the one or more confirmation files in the fabric management application.

13. The non-transitory computer-readable medium or media of claim 12 wherein the step of using the imported network drawing file and the one or more configuration files to map the network fabric represented by the imported network drawing and the one or more confirmation files in the fabric management application further comprises:

determining one or more network relationships or configurations based upon at least some of the associated logical network connectivity-related properties, at least some of the one or more configuration files, or both.

14. The non-transitory computer-readable medium or media of claim 9 wherein the networking drawing represents an existing network and the non-transitory computer-readable medium or media further comprises one or more sequences of instructions which, when executed by at least one processor, causes steps to be performed comprising:

using the network fabric to design an expansion of the existing network.

15. The non-transitory computer-readable medium or media of claim 9 further comprising one or more sequences of instructions which, when executed by at least one processor, causes steps to be performed comprising:

prompting a user to provide one or more pieces of networking information related to the network drawing.

16. An information handling system comprising:

at least one processor; and a non-transitory computer-readable medium or media comprising one or more sequences of instructions which, when executed by at least one of the one or more processors, causes steps to be performed comprising:

given a network drawing file comprising a network drawing generated using a diagramming application and a set of defined stencils of network elements in which one or more network elements depicted in the network drawing include one or more associated logical network connectivity-related properties, importing the network drawing file, including the one or more associated logical network connectivity-related properties, which includes one or more logical network connectivity-related properties between one or more network elements of a network fabric depicted in the network drawing, into a fabric management application in which the one or more network elements and the associated logical network connectivity-related properties of the network fabric depicted in the network drawing are recognized by the fabric management application given that the set of defined stencils have a known format or formats;

using the imported network drawing file to generate a network fabric representation in the fabric management application; and using the network fabric representation and the fabric management application to apply one or more features supported by the fabric management application to one or more network elements of a network fabric corresponding to the network fabric representation.

17. The information handling system of claim 16 wherein the non-transitory computer-readable medium or media further comprises one or more sequences of instructions which, when executed by at least one processor, causes steps to be performed comprising:

representing the network fabric as the network drawing using the diagramming application and the set of defined stencils of network elements in which at least some of the defined stencils comprise one or more fields for storing one or more associated logical network connectivity-related properties.

18. The information handling system of claim 16 wherein the non-transitory computer-readable medium or media further comprises one or more sequences of instructions which, when executed by at least one processor, causes steps to be performed comprising:

importing one or more configuration files associated with one or more network elements represented in the network drawing, in which a configuration file of a network element comprises logical network connectivity-related configuration information about the network element in a deployed network; and correlating a configuration file from the one or more configuration files with a network element in the network drawing.

19. The information handling system of claim 18 wherein the step of using the imported network drawing file to generate a network fabric representation in the fabric management application comprises:

using the imported network drawing file and the one or more configuration files to map the network fabric represented by the imported network drawing and the one or more confirmation files in the fabric management application.

20. The information handling system of claim 16 wherein the non-transitory computer-readable medium or media further comprises one or more sequences of instructions which, when executed by at least one processor, causes steps to be performed comprising:

generate one or more configuration files to be applied to one or more network elements to configure at least part of a network fabric corresponding to the network fabric representation.

* * * * *